United States Patent [19]
Ng et al.

[11] Patent Number: 5,473,363
[45] Date of Patent: Dec. 5, 1995

[54] SYSTEM, METHOD AND MULTIPOINT CONTROL UNIT FOR MULTIPOINT MULTIMEDIA CONFERENCING

[75] Inventors: Dennis Ng, Northboro; Jian Yang, Norwood; M. Vedat Eyuboglu, Concord, all of Mass.

[73] Assignee: Motorola, Inc., Schaumburg, Ill.

[21] Appl. No.: 280,423

[22] Filed: Jul. 26, 1994

[51] Int. Cl.$^6$ .............................. H04M 11/00; H04N 7/15
[52] U.S. Cl. .................... 348/15; 379/202; 370/62
[58] Field of Search ................ 348/14–20; 379/93, 379/94, 96–98, 202–207; 370/62, 110.1

[56] References Cited

U.S. PATENT DOCUMENTS

| | | | |
|---|---|---|---|
| 5,003,532 | 3/1991 | Ashida et al. | 379/205 |
| 5,402,418 | 3/1995 | Shibata et al. | 348/15 |

*Primary Examiner*—Wing F. Chan
*Attorney, Agent, or Firm*—Darleen J. Stockley

[57] ABSTRACT

Multipoint control units are networked utilizing a predetermined number of mixing operations such that delay is reduced while maintaining overall quality. The present invention provides an advantageous system by also substantially reducing communication costs by utilizing efficient networking.

31 Claims, 9 Drawing Sheets

SYSTEM, METHOD AND MULTIPOINT CONTROL UNIT FOR MULTIPOINT MULTIMEDIA CONFERENCING

FIELD OF THE INVENTION

The present invention relates in general to multipoint videoconferencing, and in particular, to networking of multipoint videoconferencing.

BACKGROUND

Advances in digital compression and availability of international standards and digital networks have created a growing interest in multimedia conferencing systems. There is a trend for many multimedia conferences to be multipoint, i.e., involving three or more participants.

Presently, multipoint videoconferencing is implemented using a centralized multipoint control unit (MCU) which is responsible for providing, among other functions, audio mixing and video switching functions. In the future, MCUs will also provide video mixing to allow participants to view more than one person at a time.

A significant drawback of existing MCUs is a lack of an advantageous networking system. Networking can substantially reduce communication costs: for example, if a large organization has a single MCU located in Atlanta, and two or more conferencing sites are utilized in the West Coast, each West Coast site needs to establish an individual connection to Atlanta, thus incurring high transmission costs. If two MCUs were used, one in the West Coast and the other in the East, only a single coast-to-coast transmission line would be required.

Existing MCUs provide a limited networking capability through cascading. In a cascade, each MCU provides audio mixing independently by decoding the audio bitstreams, mixing, and then re-encoding for transmission. This causes tandem encodings, thus creating long delays and degrading audio quality. The videoconferencing operation degrades upon the addition of video mixing.

Thus, there is a need for a more efficient multipoint multimedia conferencing system that reduces delays while concommitantly improving quality of transmission.

DETAILED DESCRIPTION OF A PREFERRED EMBODIMENT

The present invention provides a system wherein multipoint control units are networked utilizing a predetermined number of mixing operations wherein delay is reduced while maintaining overall quality.

Figure 1:
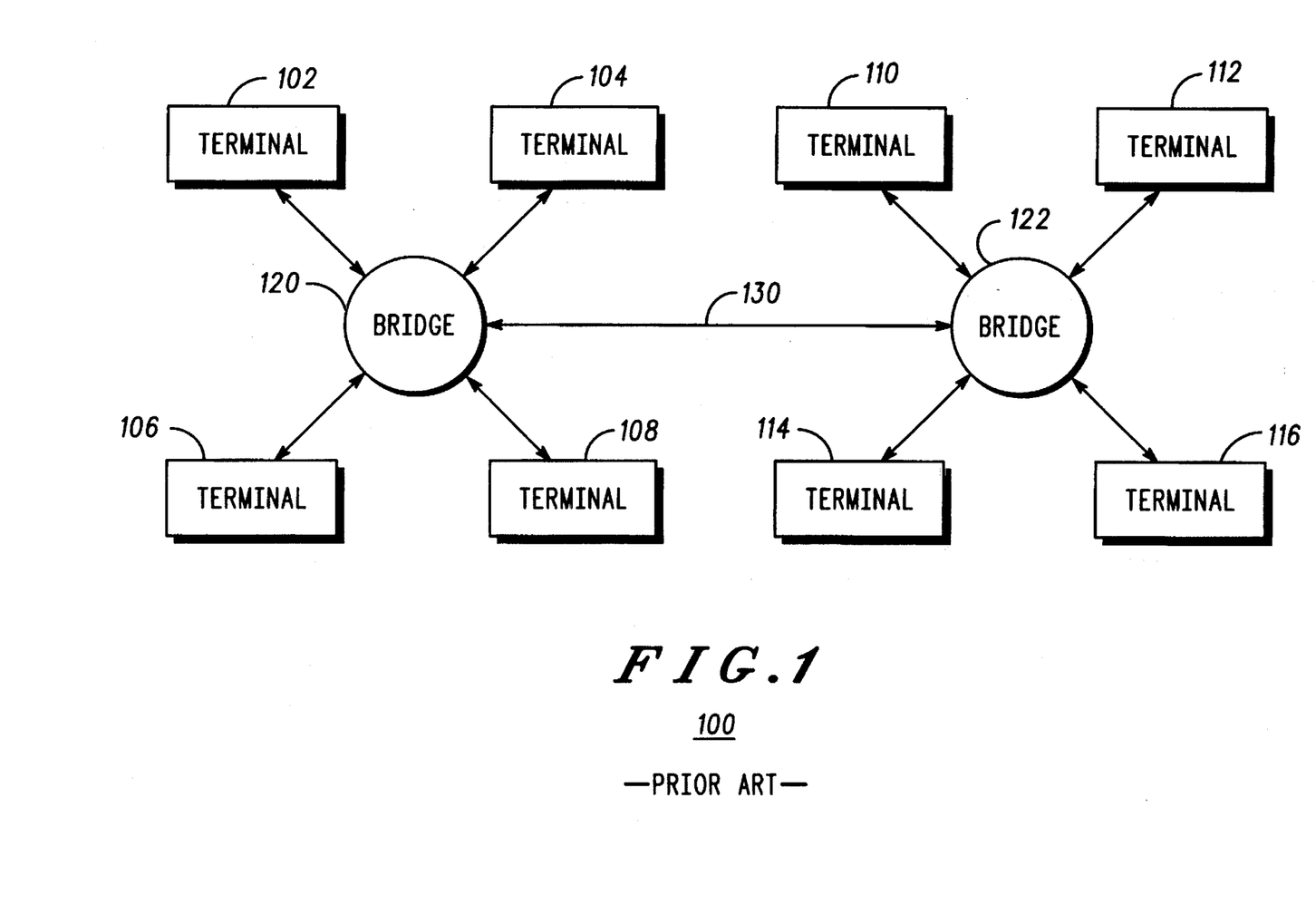
FIG. 1 shows a general block diagram of a multipoint multimedia conferencing system as is known in the art.

FIG. 1, numeral 100, shows a general block diagram of a multipoint multimedia conferencing system as is known in the art. Terminals (102, 104, 106, 108, 110, 112, 114, 116) are utilized for sending and/or receiving any combination of audio, video, and data traffic and communicate with each other via a centralized MCU (120 or 122). In FIG. 1, terminals 102, 104, 106, and 108 are directly connected to MCU 120, while terminals 110, 112, 114, and 116 are directly connected to MCU 122. MCUs 120 and 122 are cascaded together via a communications link (130), thus allowing the first group of terminals to communicate with the second group.

The distributed protocol of the present invention eliminates certain tandem encodings required by the prior art by mixing the loudest N speakers no more than N-1 times, N a positive integer. In the first embodiment shown in FIG. 2 described below, the two loudest audio sources (N=2) are heard by other participants in the conferencing system.

Figure 2:
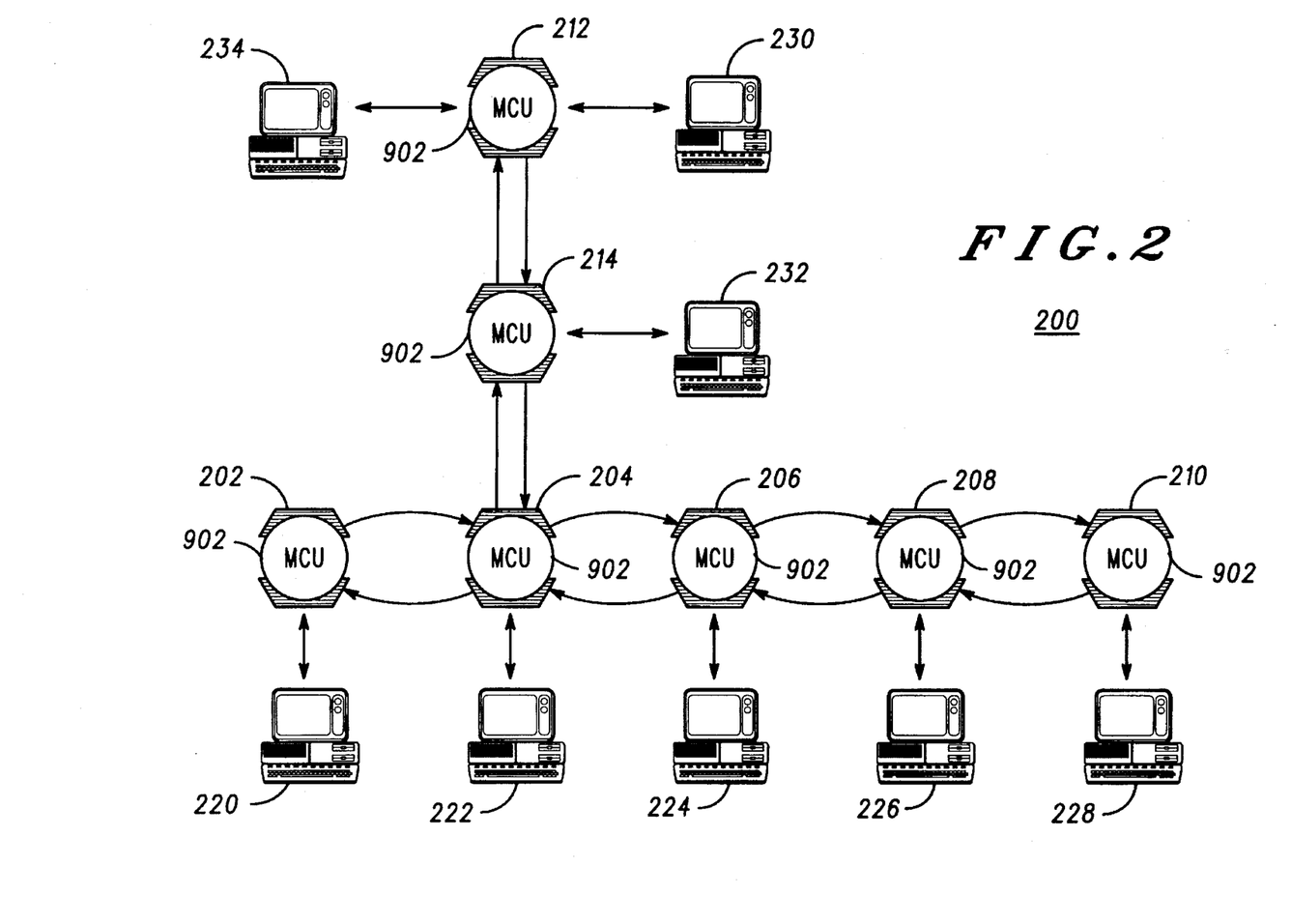
FIG. 2 is a block diagram of a first embodiment of a network for a distributed multipoint multimedia conferencing system in accordance with the present invention.

FIG. 2, numeral 200, is a block diagram of a first embodiment of a network for a distributed multipoint multimedia conferencing system in accordance with the present invention. The network includes MCUs 202, 204, 206, 208, 210, 212, and 214, as well as multimedia terminals 220, 222, 224, 226, 228, 230, 232 and 234 which are capable of sending and receiving audio, video, data, and other multimedia traffic. The terminals are connected to MCUs via full-duplex communications links. The MCUs are connected together via full-duplex communications links, used to exchange traffic, control, and status information. The inter-MCU links generally have the same capacity as the terminal-to-MCU links. Also, in FIG. 2, an MCU may be selected to be connected to two or more other MCUs (204), as well as having one or more terminals (212). Each MCU includes at least an audio signal selector, operably coupled to receive digital audio signals from at least a second MCU and from at least a first conferencing terminal, and a conferencing audio mixer, operably coupled to the audio signal selector, both of which are described in more detail below. The invention applies to a general configuration where MCUs are connected in an arbitrary tree topology and each MCU can support an arbitrary number of terminals.

The distributed MCU protocol described in this preferred embodiment has at least the following features:

the video of the present speaker is seen by all others;

the video of the previous speaker is seen only by the present speaker;

the audio of the two loudest active speakers is heard by all others. In addition, in order to avoid a speaker's hearing his own echo, each audio heard by the loudest speakers will exclude its own audio.

Figure 3:
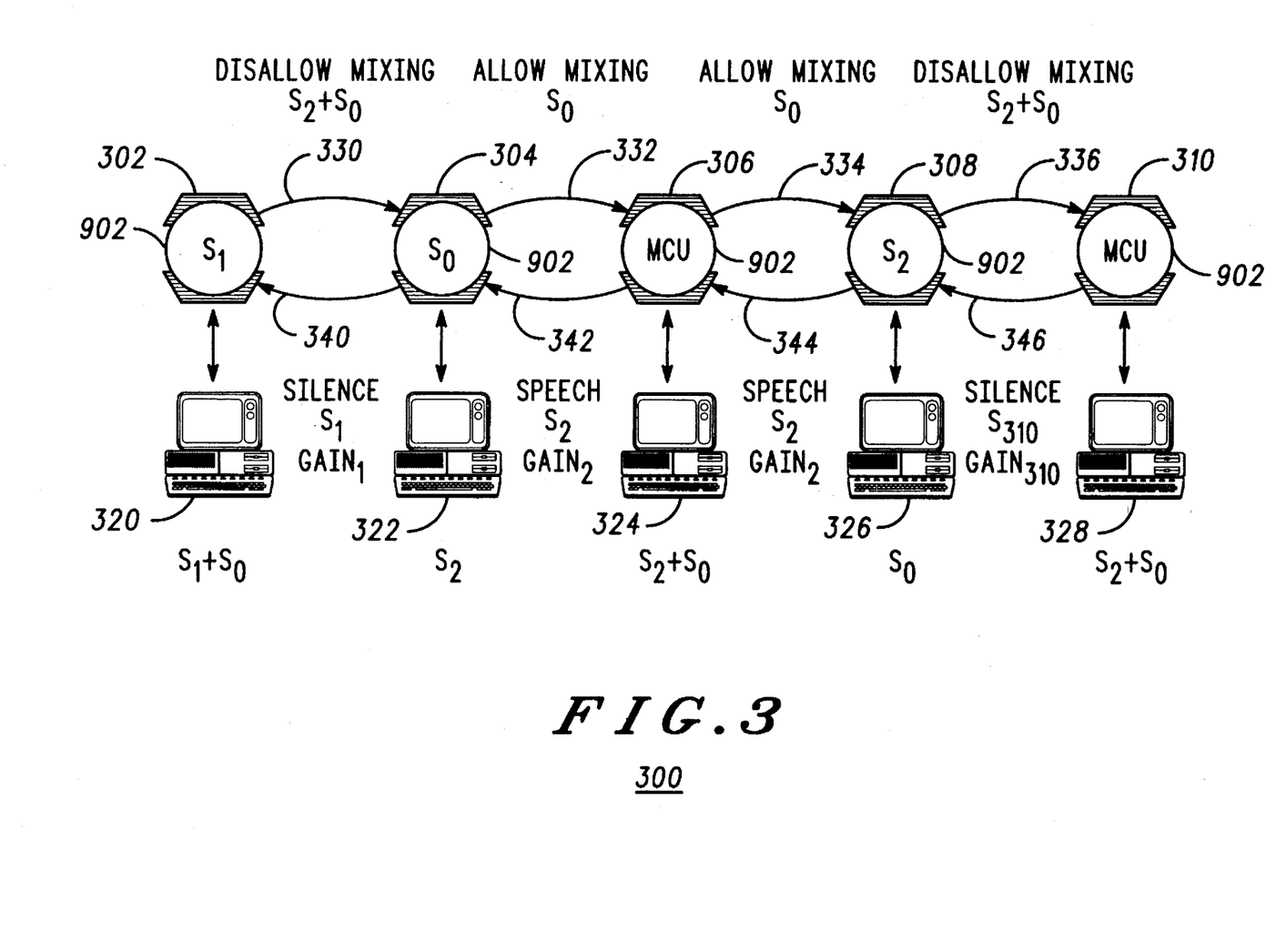
FIG. 3 shows a simplified schematic configuration for a preferred embodiment of the present invention wherein each MCU is connected at most to two other MCUs, thus forming a chain.

FIG. 3, numeral 300, shows a simplified schematic configuration for a preferred embodiment of the present invention wherein each MCU is connected at most to two other MCUs, thus forming a chain, and each MCU is connected to a single terminal. The terminals are compliant with the ITU-T H.320 standard. A terminal communicates with its MCU using the time-division multiplexing format H.221 and control protocols H.230 and H.242 used in Recommendation H.320. In H.221, information is transmitted synchronously using 10 ms frames.

In FIG. 3, at any instant of time, the control of audio mixing and video switching can be reduced to three MCUs of interest:

$S_0$—the MCU of the present speaker (token holder), $S_1$—the MCU of the loudest speaker on one side of $S_0$, and $S_2$—the MCU of the loudest speaker on the other side of $S_0$.

In one implementation of the present invention, participants can simultaneously hear the token holder and the loudest non-token holder. This is very suitable for many conferencing applications, because it allows participants to interrupt the present speaker, and at the same time it discourages participants from interrupting each other too frequently. As set forth below, other implementations of the invention allow participants to hear the two loudest speakers regardless of the participant's token status, thus allowing two participants to interrupt the present speaker at the same time.

FIG. 3 shows a sample assignment of $S_0$, $S_1$, and $S_2$ at one instant in time. The MCUs assuming the roles of $S_0$, $S_1$, and $S_2$ all dynamically change during the course of the conference, as each participant takes turns talking. All traffic sent from $S_0$ is termed outbound traffic, and all traffic into $S_0$ is termed inbound traffic. In FIG. 3, outbound traffic is sent on internodal links 330, 332, 334, and 336, while inbound traffic is sent on internodal links 340, 342, 344, and 346. The MCU assuming the role of $S_0$ always includes speaker status information in the outgoing frames so that all others can know which frames are from $S_0$, and hence which direction is inbound and which is outbound.

MCUs communicate with each other using the H.221 frame structure. Each frame includes overhead bits, the meaning of which will become clear from the details set forth below. For inbound frames, these are:

4 bits—audio level (0000: silence).

2 bits—speaker status (00: neither present nor previous speaker, 01: previous speaker, 10: present speaker, 11: present speaker and ex-previous speaker).

For outbound frames, the overhead bits are:

1 bit—allow/disallow mixing 1 bit—to assign new speaker token 1 bit—to freeze video 2 bits—speaker status (as in inbound frames).

For inter-MCU links (i.e., links 330, 332, 334, 336, 340, 342, 344, 346), the A-bit, E-bit, and CRC-4 bits from the H.221 frame can be used to transmit these overhead bits. Interoperability with H.320 terminals will be maintained, as long as correct A-bit, E-bit, and CRC-4 bits are inserted for terminal-to-MCU communication.

In the operation of the protocol in accordance with FIG. 3, each MCU (except $S_0$), on a frame-by-frame basis, compares the power of the inbound audio frame received from the neighboring MCU with that from a local terminal, i.e., a terminal utilizing the MCU. When the local audio frame is louder, the MCU inserts the local audio frame into the transmitted inbound audio frame. When the received inbound audio frame is louder, the MCU inserts the received inbound audio frame into the transmitted inbound audio frame. Since each MCU follows these same rules, the inbound audio finally reaching $S_0$ on links 342 and 340 will be the loudest on the left and right of $S_0$, respectively.

To help reduce the delay and processing required for the audio comparisons at each MCU, the gain of the inbound audio frame is attached to the frame on all inbound links (340, 342, 344, 346). Thus, the inbound audio does not need to be decoded at every MCU to determine the inbound audio level. Four overhead bits are used to represent the inbound audio gain, typically with 0000 representing silence.

For the operations performed by $S_0$, as shown in FIG. 3, numeral 300, where $S_2$ is louder than $S_1$ (note that when $S_1$ and $S_2$ are of the same level, the procedure below still applies, except $S_0$ now chooses between $S_1$ and $S_2$ in a predetermined fashion). $S_0$ compares the inbound audio level on links 340 and 342 and determines that $S_2$ is louder than $S_1$, and sends $S_2$ to its terminal (322). In addition, $S_0$ sends out the mixed audio $S_0+S_2$ on link 330 (towards $S_1$). To ensure that the audio is not mixed again by another MCU downstream, $S_0$ sets the outbound status bits to disallow mixing. This ensures that all MCUs on the left of $S_0$ hear both $S_0$ and $S_2$.

On the other side, it is undesirable for $S_0$ to send the mixed audio $S_0+S_2$ on link 332 because the local terminal attached to $S_2$ will then hear an echo of its own audio. Instead, $S_0$ sends the audio of only $S_0$ on link 332, and induces the MCUs further downstream to do mixing. This is accomplished by transmitting the audio of $S_0$ on link 332, along with the status bits set to allow mixing. The MCUs in-between $S_0$ and $S_2$ (306) read that the outbound status is allow mixing and mix the outbound audio ($S_0$) with the inbound audio ($S_2$) and send $S_0+S_2$ to their terminals (324). When the outbound traffic reaches $S_2$ (308), the audio of $S_0$ is sent to $S_2$'s terminal (326). In addition, $S_2$ determines that it is the loudest non-token holder (outbound status is allow mixing and the local audio is louder than the received inbound audio). Therefore, $S_2$ mixes the outbound audio So with its own $S_2$ audio, and propagates the mixed audio $S_0+S_2$ downstream on link 336, as well as changing the outbound status to disallow mixing to prevent further mixing. By changing the outbound status to disallow mixing, MCU 308 ensures that all other downstream MCUs (310) will play out the already mixed audio $S_0+S_2$, and no further mixing will occur.

In the distributed multipoint conferencing system described above, it is essential to minimize the processing delay in each MCU to keep the overall delay low, thus accommodating a larger number of conference participants and improving overall audio quality. In the present invention, the processing delay at each MCU is kept small by processing incoming frames on the fly (without storing the entire frame). However, the processing delay during audio mixing may be long, and therefore, at the beginning of mixing there may not be enough audio bits to transmit in the outbound direction. To solve this problem, the protocol of this invention allows the MCU to insert idle (filler) bits for the audio at the beginning of mixing. At the end of mixing, the MCU intentionally drops audio information to ensure that delays will not accumulate. To simplify the processing, the idle bits may be chosen to take up exactly M frames, and then M frames are dropped at the end of mixing. The receiving MCU removes the idle bits and recovers missing frames from neighboring frames using speech interpolation.

Intermediate MCUs relay the mixed outbound bit stream without any modifications. The receiving MCU introduces an initial smoothing delay so that incoming frames can be played out continuously after the filler bits are stripped out. The receiving MCU detects the beginning and end of mixing by observing the status of the "allow mixing" bit.

The audio glitch caused by the frame drop may be selected to be eliminated by allowing each MCU introduce a sufficiently long buffering delay to account for mixing. But then these delays will accumulate as in conventional cascaded MCUs. Alternatively, since audio bits are not of equal importance, instead of completely throwing away the audio samples at the end of mixing, the mixing MCU may send the more significant bits of the audio samples in the next frame in place of the less significant bits of the audio samples in the previous frame.

Summarizing the rules for audio processing:
1) In the inbound direction:
Each MCU determines the speech level for every frame of audio received from the local terminal.
Each MCU (except $S_0$) compares the level of the inbound audio received from its neighboring MCU with that of local audio and transmits the louder one towards $S_0$.
At $S_0$, the audio coming from the louder inbound link is played out to the local terminal.
2) In the outbound direction:
$S_0$ prevents audio from $S_1$ to enter link 330, and audio from $S_2$ to enter link 332, to avoid echoes. The outbound audio on link 330 can be either So or $S_0+S_2$, depending on whether $S_1$ or $S_2$ is louder. Likewise on link 332, the outbound audio may be either $S_0$ or $S_0+S_1$.

The outbound status bit allow/disallow mixing (already mixed), i.e., mixing flag, is set accordingly.

All MCUs (except $S_0$) examine the outbound allow/disallow mixing flag. If the mixing flag is allow mixing and the inbound audio is louder than local audio, the MCUs mix the inbound audio with the outbound audio and each MCU sends the mixed audio to its local terminal (e.g., node 306). Otherwise, only the outbound audio is sent to the local terminal (e.g. node 302, 310 and 308).

At any of the MCUs (except $S_0$), the outbound audio traffic is typically relayed outbound as is. However, at either $S_1$ or $S_2$, if the outbound status is allow mixing (e.g. on link 334), then the outbound audio payload (e.g. on link 336) is replaced by mixing the incoming downstream audio (on link 334) with the MCUs audio (from terminal 326), and changing the outbound status to disallow mixing on link 336.

The above discussion has concentrated mainly on audio mixing and assumed steady-state operation (present speaker $S_0$ is fixed). For implementation of video switching and the technique for passing the speaker token, in the example shown in FIG. 3, there are two active talkers: $S_0$ and $S_2$. In steady-state, $S_0$ is the louder of the two speakers, and therefore holds the speaker token. $S_0$'s video is broadcast and seen at all receiving terminals. The previous speaker sends its video towards $S_0$. Note that all MCUs know the direction towards So because all outgoing frames from $S_0$ have status bits attached indicating that $S_0$ holds the speaker token. For example, if MCU 306 is connected to the terminal for the previous speaker, the MCU replaces the video payload of inbound packets on link 342 with its own, so that $S_0$ will see the video of MCU 306. In addition, the MCU for the terminal for the previous speaker, 306, must properly set the speaker status bits in the inbound frames so that $S_0$ may determine which video payload (340 or 342) contains the previous speaker.

When the audio from $S_2$ becomes louder than the audio from $S_0$, a speaker token transition occurs. This is initiated by $S_0$ when $S_0$ determines that it is no longer the loudest speaker and relinquishes the speaker token to $S_2$ by setting the token assignment bit on the outbound link 332. The loudest speaker is the first downstream MCU that replaced the inbound audio with its own. Therefore, as the token assignment bit propagates downstream, the MCU which accepts the token is the one which is closest to $S_0$ and which replaced the inbound audio with its own, e.g., MCU 308. This MCU seizes the speaker token, and the new speaker of a terminal of the MCU takes the role of $S_0$, broadcasting its video, and setting its outbound speaker status bits to signify that it is now the current speaker. When the MCU for the terminal of the ex-speaker receives this status bit, the speaker status is changed from the speaker state to the previous speaker state.

Coincident with assigning the speaker token, $S_0$ sends a freeze video command to all MCUs. The only MCU that doesn't freeze its video is the new token holder $S_2$. All other MCUs send a freeze video command to their terminals. After a predetermined time-out, the MCU for the new speaker sends a fast video update command to its own terminal to induce it to send a video frame in the fast update mode and a picture release command to unfreeze the other video displays. Thus, the token assignment is completed, and the video of the new speaker is sent to all receiving terminals, while the video of the ex-speaker is sent to the terminal of the new speaker.

Summarizing the rules for video processing:
1) So broadcasts the video of its local terminal on all outgoing links and sets the two outgoing speaker status bits to 10 or 11. All MCUs display the video broadcasted by $S_0$.
2) The MCU for the previous speaker replaces the video payload in the inbound packets with the previous speaker's video, and sets the two inbound status to 01.
3) When a new speaker token is to be assigned, the assign video token command is sent by $S_0$ on the outbound link towards the new loudest speaker.
4) When a token is to be assigned, a freeze video command is sent by $S_0$ on all outbound links. Upon receiving this command, all MCUs except the new speaker freeze the video display of their local terminal.
5) When the MCU for the new speaker accepts the speaker token, the MCU terminates the token and does not propagate it downstream. The MCU signals back to $S_0$ that it has taken the token. Upon receipt of this signal, $S_0$ transitions to the previous speaker state and changes its speaker status bits to 01.
6) After a brief time-out, the MCU of the new speaker sends a fast video update command to its terminal. This terminal responds by sending a video frame in the fast update mode and a picture release command to unfreeze the video displays of all the potential viewers.

It is possible to extend this protocol slightly to allow two participants on opposite sides of the current speaker to interrupt the current speaker, so that they are both heard before the token transition. This is accomplished by allowing the current token holder to relay the two inbound audio bitstreams across and mix them for its local terminal when its own audio is weaker than either of the inbound audio bitstreams.

Figure 4:
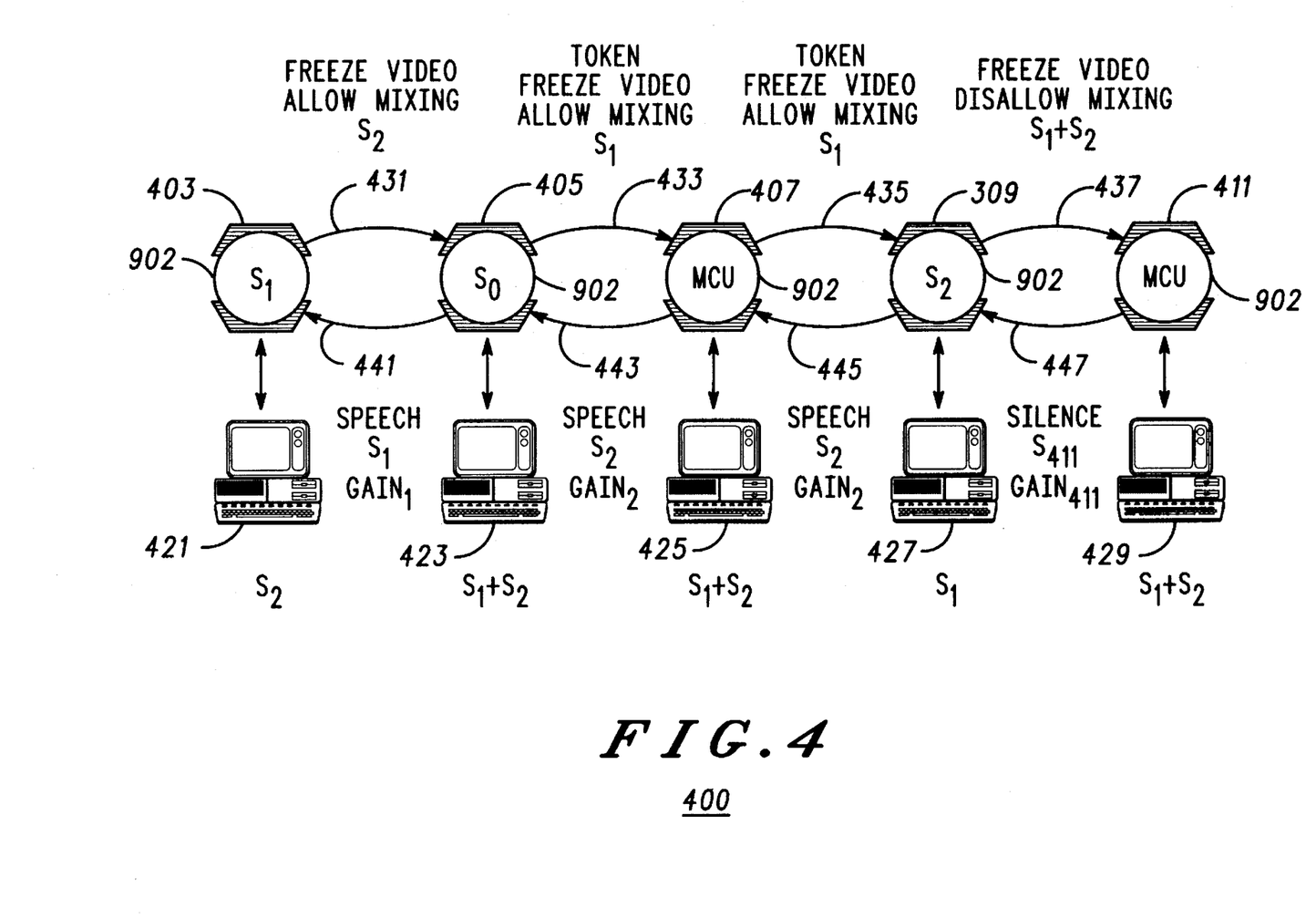
FIG. 4 is a schematic illustrating an implementation wherein the system migrates from the state described in FIG. 3 into a state with three active speakers, $S_1$, $S_0$ and $S_2$ in accordance with the present invention.

FIG. 4, numeral 400, is a schematic illustrating an implementation wherein the system migrates from the state described in FIG. 3 into a state with three active speakers, $S_1$, $S_0$ and $S_2$ in accordance with the present invention. Their relative volumes are $S_2 > S_1 > S_0$.

The current speaker, $S_0$, realizes that the incoming audio from link 443 is the loudest. Therefore it passes the speaker token towards link 433, and broadcasts freeze video command to both links 431 and 433, as shown in FIG. 4A. Since the audio received from link 441 and 443 are the loudest two, MCU So will change the audio processing shown in FIG. 3 to that of FIG. 4A, i.e. it will mix $S_1$ and $S_2$ for local playout and relay the two received audio streams. Since these audio bitstreams are not mixed, $S_0$ will set the flag to allow mixing on links 431 and 433.

MCU 403 ($S_1$), upon receiving freeze video command, will send a freeze picture command to its local terminal 421. It will continue to play out audio received from link 431.

At MCU 407, since inbound audio on link 445 is louder than that from its local terminal 425, it will relay the token down stream on link 435, and send freeze picture command to terminal 425. The audio processing at MCU 407 is not changed from that in FIG. 3. But since the audio it receives from link 433 is now that of $S_1$, $S_1$ will be heard in place of $S_0$ by terminal 425 as shown in FIG. 4A.

MCU 409 ($S_2$), the loudest speaker, will terminate the speaker token and relay the freeze video command downstream on link 437. MCU 409 itself will not send freeze picture command to its local terminal, because it continues receiving video from MCU 405. Audio processing is unchanged at MCU 409. But instead of $S_0$, terminal 427 will now hear $S_1$.

MCU 411 will send freeze picture command to terminal 429, when freeze video command is received on link 437.

Figure 5:
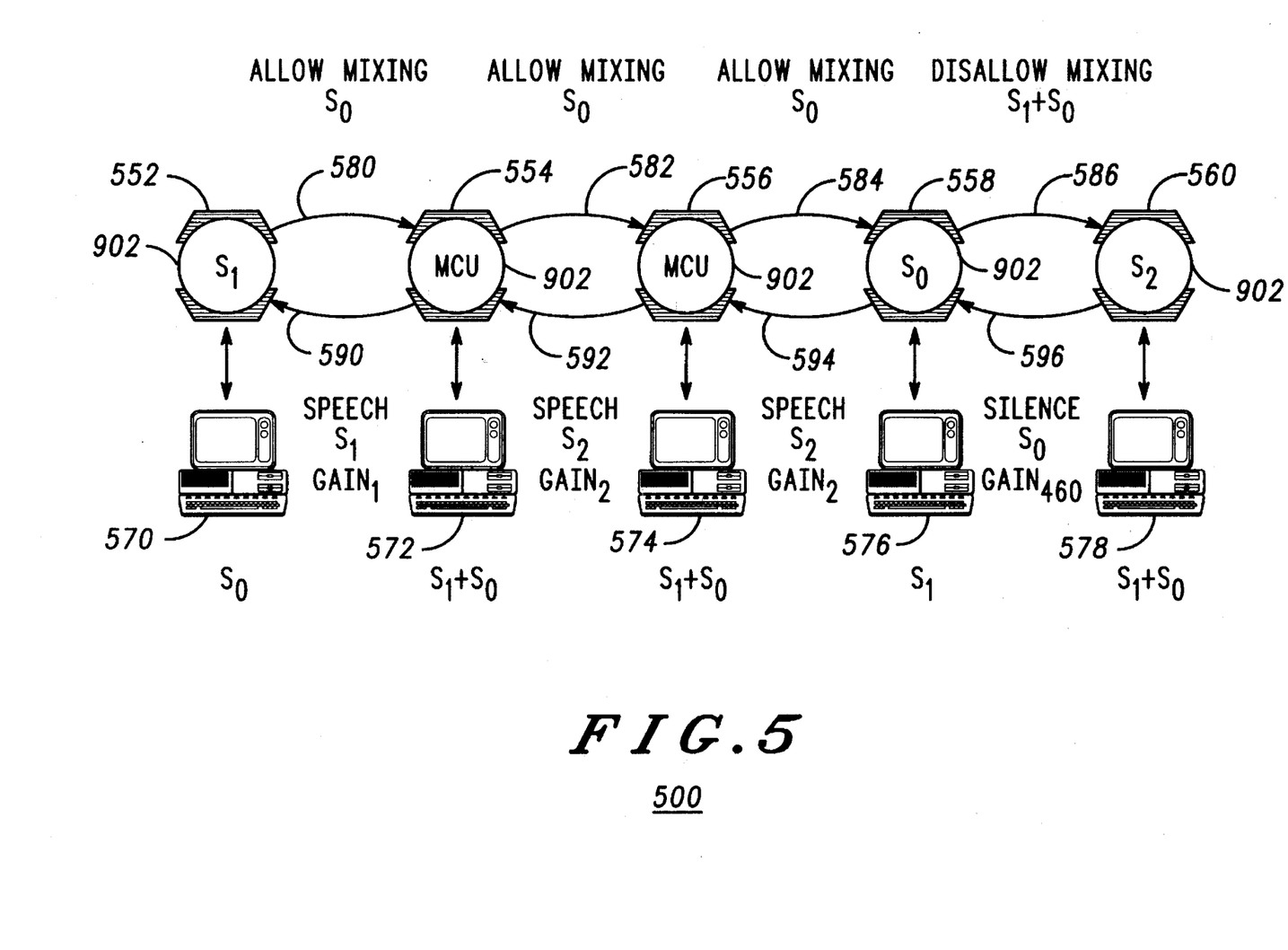
FIG. 5 is a schematic showing the result of token passing in accordance with the present invention.

FIG. 5, numeral 500, is a schematic showing the result of token passing in accordance with the present invention. After accepting the token, the new speaker, MCU 558, will assume the speaker role by sending its current speaker status on links 584 and 586 and broadcasting video from its local terminal.

The speaker status bits will be relayed by MCU 556 to be received by MCU 554, the previous token holder. It will then give up the speaker role and start relaying video from MCU 558 onto link 580. If the speaker status bits from the MCU 558 indicate it is the previous speaker, MCU 554 does not need to freeze its local terminals display, otherwise it will send freeze picture command to terminal 572. Realizing that link 592 no longer holds the video of the current speaker and that the video of the current speaker comes from link 584, MCU 556 switches its local playout video from link 592 to that of link 584.

After a timeout to allow display-frozen terminals to reestablish sync to the new video source, the new speaker 558 will issue a fast update request to its local terminal which in turn will send fast update video frame and unfreeze command in its video bitstream.

All other terminals, except possibly 572, will unfreeze their display and the token transition will be completed. Audio processing at all MCUs during this period is same as that of FIG. 4.

Note that in this case, the new speaker will keep watching the video of the previous speaker, while all other MCUs switch display to the current speaker after a temporary picture freeze, except the previous speaker who may continue watching the new speaker. The audio heard by all MCUs are those of the loudest two at all time, except the loudest two speakers themselves, who will not hear their own audio.

Another possible enhancement of the basic protocol of the present invention is to add audio mixing in the inbound direction. The protocol described so far, allows a second speaker to interrupt the current speaker when they are on opposite sides of the current speaker. It is possible to extend this protocol to allow two speakers to interrupt the current speaker even when they are on the same side, when the present speaker is temporarily silent. (In the case where there are multiple speakers, and they are on the same side of the token, the second speaker will be temporarily cut out under the basic protocol. Eventually, this situation triggers a token transition to the new loudest speaker, after which both speakers will be heard. Even though they will both eventually be heard, the temporary disruption may be annoying.) This is achieved by adding a speech/silence bit in the outbound direction to indicate the status of the token holder and then allowing mixing to be performed in the inbound direction (instead of mixing only in the outbound direction).

The only extension necessary to accomplish this is with the audio processing done by non-token holders.

1) For inbound audio, if the speech/silence bit from the token holder indicates silence and the local audio is speech, the MCU mixes the audio signals that it receives from its inbound link and its local terminal, and sends it towards the token holder. The inbound audio gain is set to the gain of the local or inbound audio, whichever is louder.

2) For outbound audio, the same MCU sends its local audio on the outbound link, and replaces the silence status bit to speech.

Figure 6:
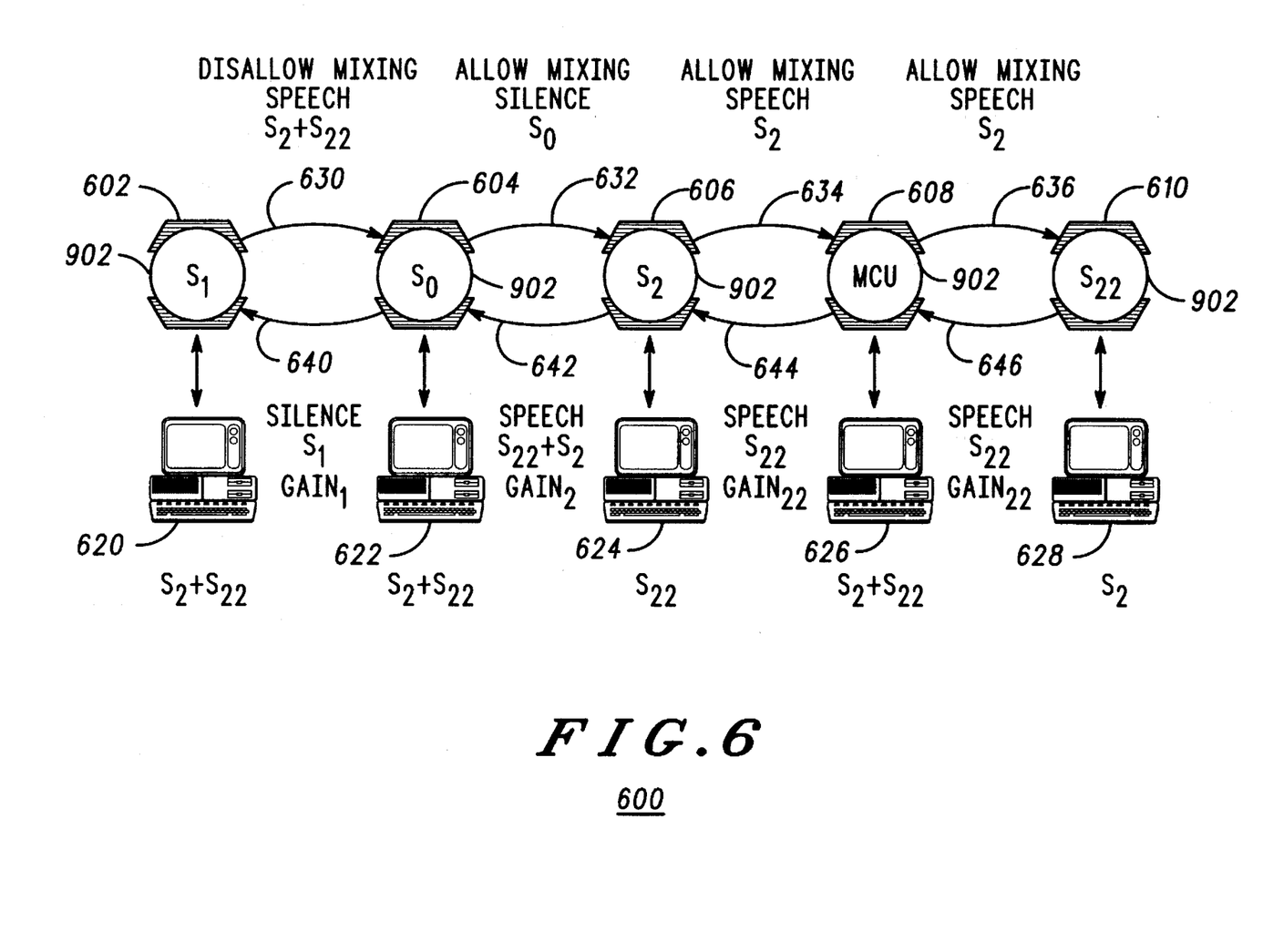
FIG. 6 shows a schematic of an implementation of the present invention wherein inbound audio mixing enhancement is included.

FIG. 6, numeral 600, shows a schematic of an implementation of the present invention wherein inbound audio mixing enhancement is included. Two active speakers are present, $S_2$ (606) and $S_{22}$ (610), where $S_2$ is assumed to be louder than $S_{22}$. The token holder (604) is assumed to be silent.

At MCU $S_0$ (604), since the audio from both link 640 and local terminal 622 is silent, it will set the speech/silence bit in outbound link 632 to silence.

At MCU $S_2$ (606), since the speech/silence bit from the token on link 632 indicates silence, it will mix its local active audio (from 624) with that from inbound link 644, and send it inbound on link 642. The attached audio gain on link 642 is set to the gain of the louder audio, which is $S_2$ in this case. At the same time, the audio sent on outbound link 634 is from the local terminal 624, and the speech/silence bit on link 634 is changed to indicate active speech. This prevents downstream MCUs (608 and 610) from additionally mixing inbound audio, as this would increase the number of tandeming stages.

At MCU 608, active speech and allow mixing commands are received on link 634, so it mixes the outbound audio received on 634 with that it receives from link 646, and plays it out to its local terminal 626. On its outbound link, it sends $S_2$ only to link 636.

MCU $S_{22}$ (610) plays out the audio it receives on link 636, to its terminal (628).

Again at MCU $S_0$ (604), since the only active audio it receives is from link 642, it is played out to local terminal 622 as well as outbound on link 630.

At MCU 602, the outbound audio $S_{22}+S_2$ from $S_0$ is played out to its local terminal 620.

Figure 7:
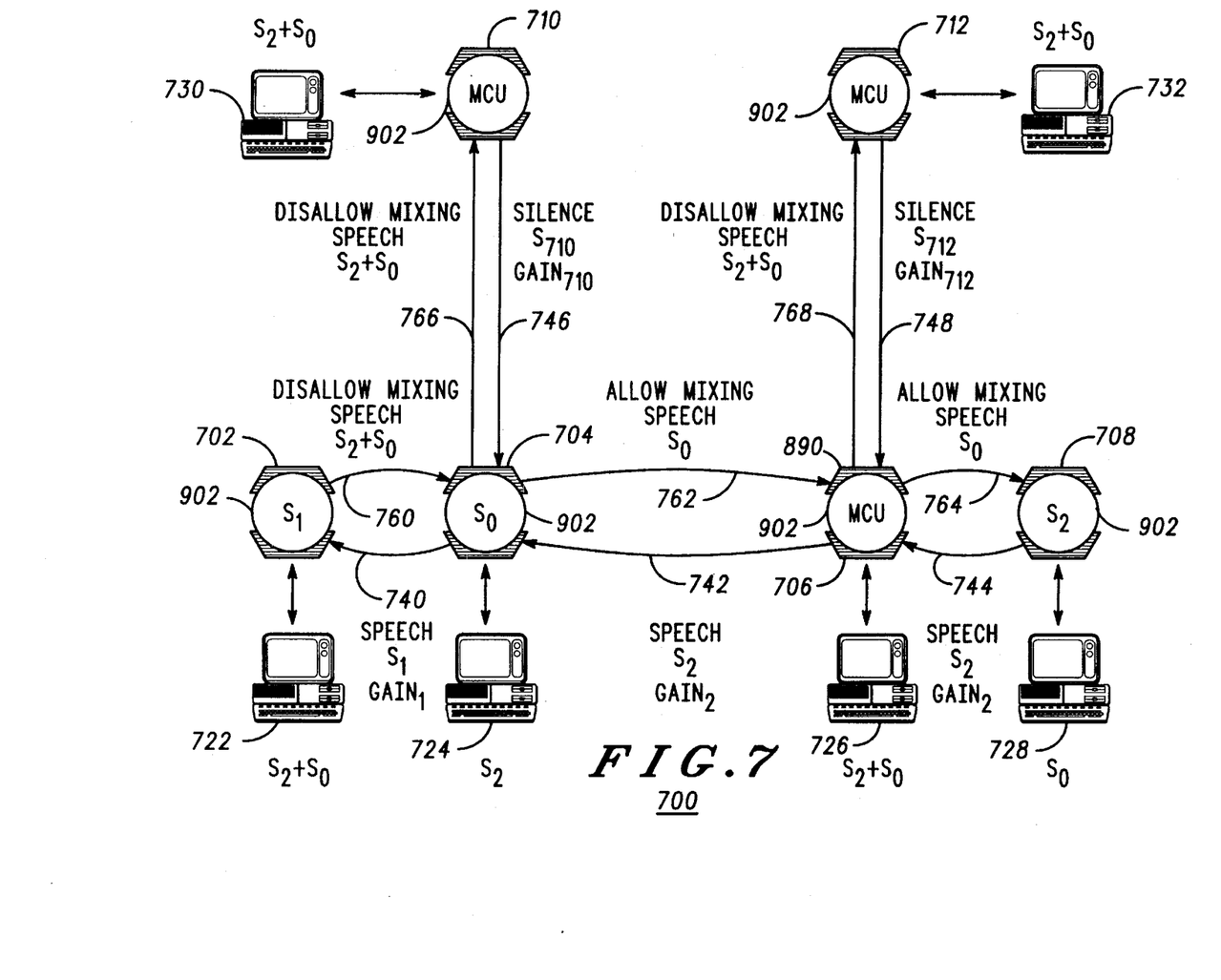
FIG. 7 shows a schematic of an implementation that accommodates an MCU that is connected to at least three MCUs in accordance with the present invention.

The protocols described above for the MCU chain can be extended to a tree configuration, by generalizing the description to accommodate an MCU being connected to three or more MCUs (instead of two, as in the chain configuration) as shown in FIG. 7, numeral 700.

In the tree configuration, the notion of inbound and outbound traffic direction is still valid. This is because the current speaker always broadcasts its speaker status bits to all internodal links, and all downstream MCUs relay these bits, such that each MCU knows which packets are from the token holder.

The following constraint applies to the description of the protocol that follows: never send/mix the audio from a link to the same link, where the "link" can either be an inter-MCU link or a link to local terminal. This avoids the undesirable effect of a user hearing an echo of its own audio.

The extension of the audio processing rules is summarized below.

1) The outbound audio sent by the current speaker (on internodal links 760, 762, 766) will be the two loudest audio it receives (including that from its local terminal), subject to the constraint.

2) The audio played out from the current speaker to its terminal (724) is composed in the same fashion as the audio that is sent out, i.e. consisting of the two loudest audio, subject to the constraint.

3) The inbound audio from any MCU (except the current speaker) will be the loudest audio the MCU receives from its inbound links and its local terminal (e.g. audio on link 742 is the loudest between 726, 744, and 748).

4) The outbound audio from any MCU (except the current speaker) will depend on the state of the allow mixing control bit it receives from the token holder.

Where mixing is disallowed, that MCU will relay the audio from the token holder to all outbound links.

Where mixing is allowed, that MCU will mix the outbound audio with the loudest audio it receives from its inbound links and its local terminal, and sends the mixed audio to all outbound inter-MCU links, subject to the constraint.

5) The audio played out by a non-token holder MCU to its terminal (e.g. 706 to 726) is composed in the same fashion as the outbound internodal audio (764 and 768), subject to the constraint.

6) Audio gain inbound control bits are set in accordance with the nature of the accompanying audio in the same way as in the chain MCU case.

The description of token passing and video control rules for the chain configuration are directly applicable to the tree configuration as well.

The inbound mixing enhancement described earlier can be incorporated into the above extension by further extending rules 3–5 with the following.

7) Where the outbound audio is silence, the MCU will mix the two loudest audio streams it receives from its inbound links and its local terminal and send the mixed audio to all links, subject to the constraint.

FIG. 7, numeral 700, shows an implementation wherein there are three active speakers (702, 704, 708) in an MCU tree, with two branch MCUs (704 and 706). A branch MCU is an MCU which is connected to three or more MCUs. The audio level of the three active speakers in FIG. 7 are ranked in the following order: $S_0 > S_2 > S_1$ (audio from 724 is louder than that from 728, which is louder than 722).

Branch MCU 706 compares the audio gain of its local terminal (726) with those from links 744 and 748. Since the audio from link 744 is the only active one, and thus the loudest of the three, it goes into the inbound link 742.

At MCU 704, the two loudest audio it receives are from its local terminal (724), and from link 742. Therefore, the audio sent on outbound links 760 and 766 are the mixed audio $S_0 + S_2$. Therefore, terminals 722 and 730 hear the loudest two speakers $S_0$ and $S_2$. The audio played out to terminal (724) is $S_2$, while that sent outbound on outbound link 762 is $S_0$. This is due to the above constraint which prevents a user from hearing its own audio. The outbound audio control bit is set to disallow mixing on links 760 and 766 (audio is already mixed, so disallow further mixing), while on link 762 it is set to allow mixing because the accompanying audio is not mixed.

Again at MCU 706, the outbound audio mixing bit received from link 762 is allow mixing. Thus it will mix the outbound audio received from the current speaker with the loudest inbound audio received, which is $S_2$, subject to the constraints, i.e. its local terminal (726) and MCU 712 both receive $S_0 + S_2$, while MCU 708 receives $S_0$. The audio mixing bit on outbound link 668 is changed to disallow mixing because the outbound audio on that link is already mixed, while link 764 remains unchanged at allow mixing because the outbound audio on that link is not mixed.

Figure 8:
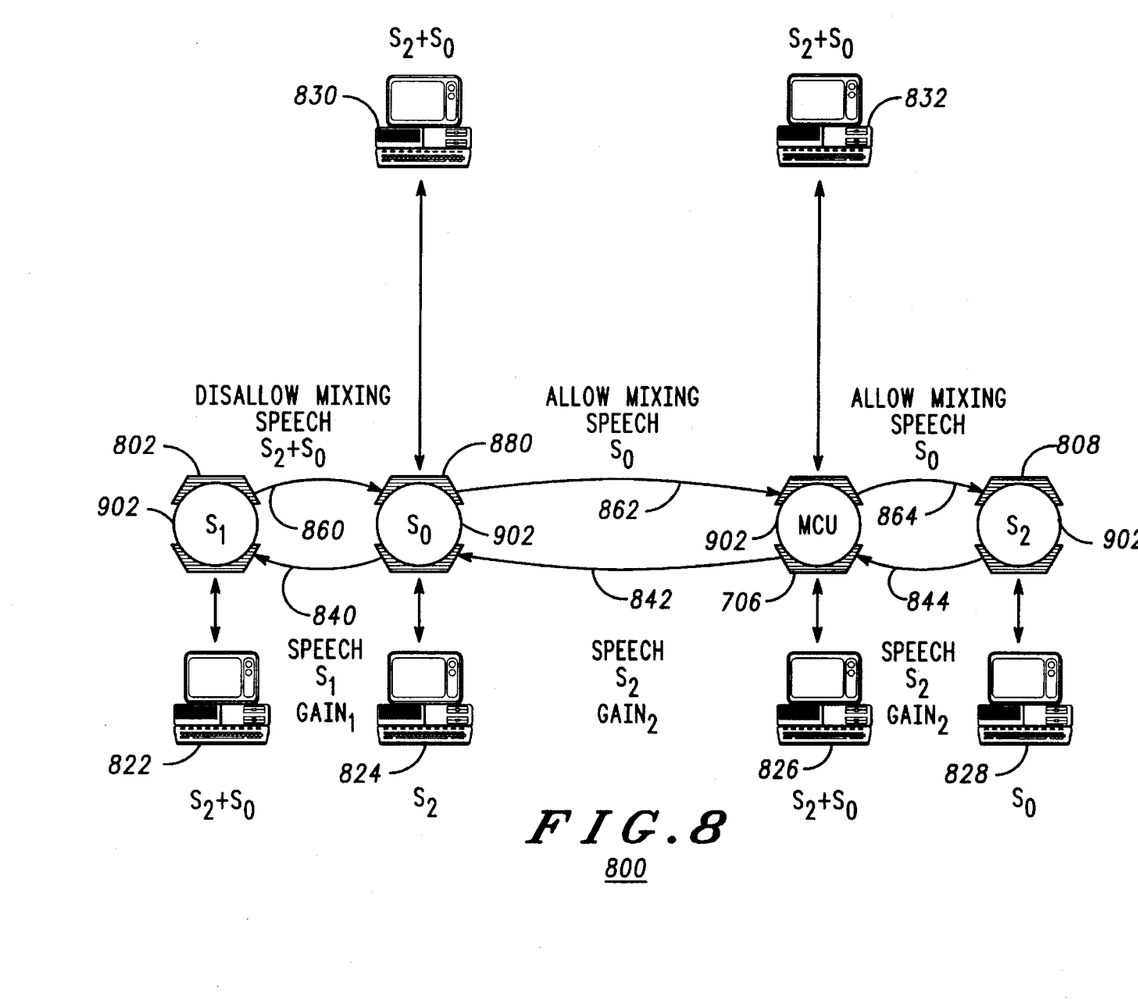
FIG. 8 shows a schematic of an implementation that combines the functions of multiple MCUs into a single MCU in accordance with the present invention.

All the illustrative examples so far have shown a single terminal connected to an MCU. However, this is not a restriction, as the invention is also capable of supporting multiple terminals connected to an MCU. This extension can be viewed as combining the functions of multiple MCUs into a single MCU. FIG. 8, numeral 800, shows such an implementation of the present invention based on the configuration from FIG. 7. The functions of MCUs 704 and 710 have been combined into a single MCU (880), and the internodal links 746 and 766 have been eliminated. Terminals 824 and 830 are now both connected to 880. Likewise, MCUs 706 and 712 have been combined into a single MCU (890), with terminals 826 and 832 both connected to it. The link between terminal 830 and MCU 880, as well as between 832 and 890, is now an access link instead of an inter-MCU link.

Figure 9:
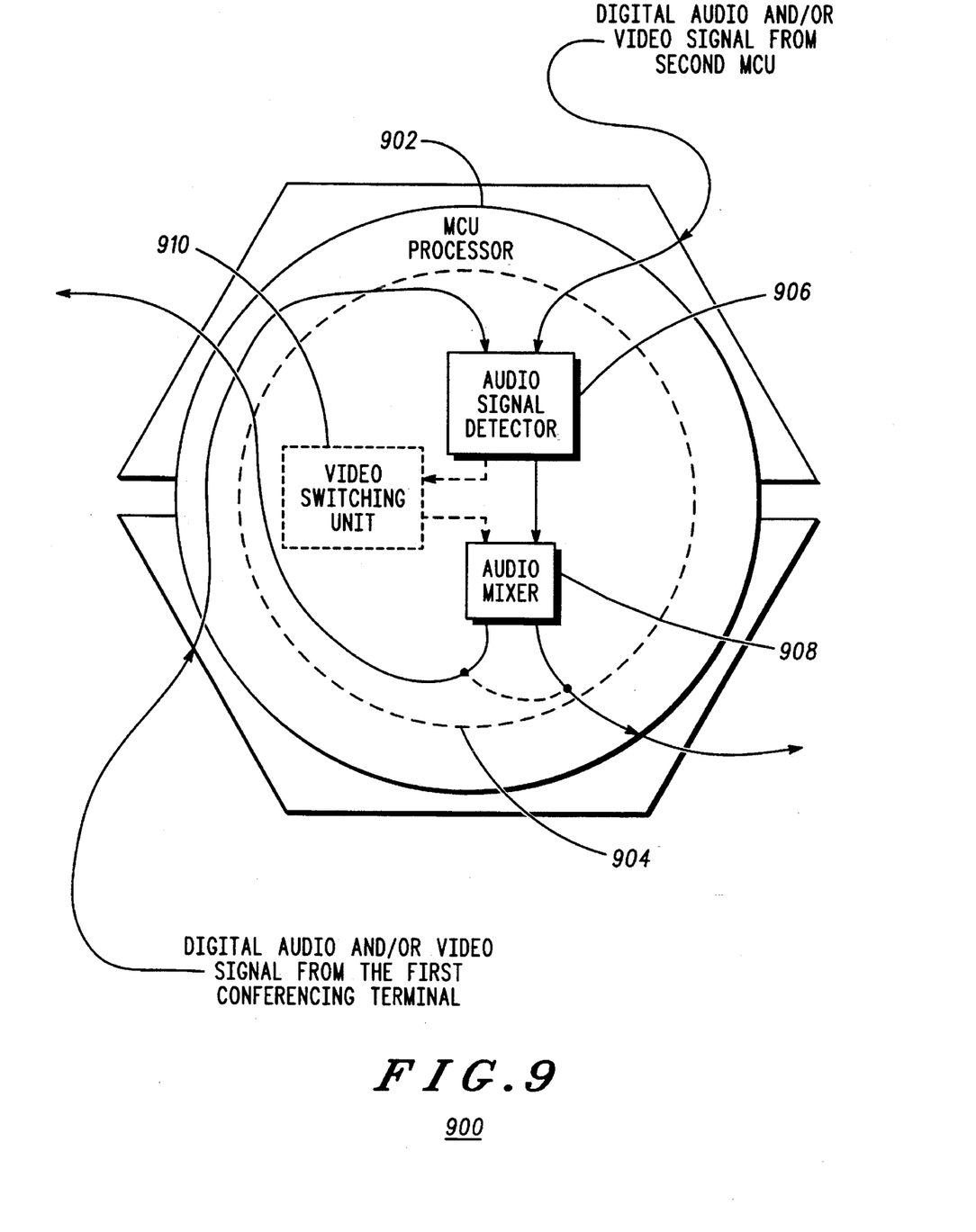
FIG. 9 is a schematic diagram of a multipoint control unit for at least a first conferencing terminal in a full-duplex communication network having at least a second conferencing terminal with at least a second multipoint control unit, for controlling conferencing between/among a plurality of conferencing terminals in accordance with the present invention.

FIG. 9, numeral 900, is a schematic diagram of a multipoint control unit (902) for at least a first conferencing terminal in a full-duplex communication network having at least a second conferencing terminal with at least a second multipoint control unit, for controlling conferencing between/among a plurality of conferencing terminals in accordance with the present invention. The multipoint control unit (902) includes a processor (904) that includes: A) an audio signal selector (906) for receiving digital audio signals from at least the second multipoint control unit and from at least the first conferencing terminal, and for selecting from all received digital audio signals, for each connected multipoint control unit, wherein said selecting is made in accordance with a predetermined selection algorithm using control information received from at least the second multipoint control unit wherein the digital audio signal is mixed N-1 times, N>2, whre N is a predetermined positive integer; and B) a conferencing audio mixer (908), operably coupled to the audio signal selector (906), for utilizing a predetermined mixing algorithm for mixing the selected digital audio signals when more than one digital audio signal is selected and for generating control information to indicate a number of times a resultant digital audio signal has been mixed. In one embodiment, the audio signal selector (906) receives digital audio signals from only two other multipoint control units.

In another embodiment, the conferencing terminals may also be selected to be videoconferencing terminals. In this embodiment, the processor further includes a video switching unit (910), operably coupled to receive digital video signal from the first conferencing terminal and from the second MCU, for providing videoconferencing as set forth above.

Although the above descriptions focus on videoconferencing applications, the present invention may also be applied to audioconferencing or audiographics applications with no video. The techniques may also be used over analog telephone lines (using analog modems), and are not restricted to digital lines. H.320 videoconferencing terminals are used as examples, but obviously the techniques can be applied to a variety of multimedia terminals, including those that use packet transmission. The technique can be used to provide video mixing, chair control or data broadcasts. Alternative implementations of the broad principles disclosed in this invention are certainly possible. Finally, even though the preferred embodiment concentrated on the case of N=2 (mix two speaker), the protocol can also be used for cases where N>2, by essentially replacing mix/don't mix overhead bit by a codeword that indicates the number of times the audio signal has been mixed.

We claim:

1. A multipoint control unit for at least a first conferencing terminal in a full-duplex communication network having at least a second multipoint control unit with at least a second conferencing terminal, for controlling conferencing between/among a plurality of conferencing terminals, wherein the multipoint control unit includes a processor comprising:

an audio signal selector for receiving digital audio signals from at least the second multipoint control unit and the first conferencing terminal, and for selecting a digital audio signal from all received digital audio signals, for each connected multipoint control unit, wherein said selecting is made in accordance with a predetermined selection algorithm using control information received from at least the second multipoint control unit, to ensure that no more than N digital audio signals are mixed, where N is a positive integer and wherein the control information indicates whether an accompanying signal may be mixed;

an audio mixer, operably coupled to the audio signal selector, for utilizing a predetermined mixing algorithm for mixing the selected digital audio signals when more than one digital audio signal is selected and for generating control information to indicate whether a resultant digital audio signal may be mixed again.

2. The multipoint control unit of claim 1, wherein said audio signal selector receives digital audio signals from only two other multipoint control units.

3. The multipoint control unit of claim 1, wherein N=2.

4. The multipoint control unit of claim 1, wherein, in addition, said conferencing terminals are videoconferencing terminals.

5. The multipoint control unit of claim 4, wherein said processor further includes a video switching unit for providing multipoint videoconferencing among the plurality of operably coupled conferencing terminal units.

6. The multipoint control unit of claim 4 wherein the digital audio signals are transmitted in frames.

7. The multipoint control unit of claim 6 wherein the frames are frames in accordance with an International Telecommunications Union-Telecommunications Sector, i.e., ITU-T, H.221 frame structure.

8. The multipoint control unit of claim 7 wherein the conferencing terminal units further operate in compliance with an ITU-T H.320 standard.

9. The multipoint control unit of claim 8 wherein the framing for communication between multipoint control units includes overhead bits comprising:

A) for inbound frames, 4 bits for audio level and 2 bits for speaker status, and B) for outbound frames, 1 bit for indicating allow/disallow mixing, 1 bit for assigning a new speaker, 1 bit for freezing video, and 2 bits for indicating speaker status.

10. The multipoint control unit of claim 6 wherein processing delay incurred upon audio signal selection and audio mixing is minimized by processing frames of incoming digital audio signals upon arrival, i.e., without storing an entire frame.

11. The multipoint control unit of claim 10 wherein a predetermined number of frames of filler bits are inserted at a beginning of mixing for digital audio signals and a same number of frames are eliminated at an end of mixing to ensure non-accumulation of delays.

12. The multipoint control unit of claim 1 wherein the predetermined mixing algorithm provides that, upon determining that a digital audio signal to be transmitted has already been mixed N-1 times, mixing control information is set to disallow mixing at other multipoint control units.

13. The multipoint control unit of claim 3 wherein the predetermined selection algorithm, when the multipoint control unit is operating as a token holder, provides that a mixed audio of a loudest, i.e., highest power, digital audio signal and a second loudest digital audio signal is selected for transmission towards all multipoint control units, except the multipoint control units that originate the loudest and the second loudest digital audio signals.

14. A multipoint control system for providing real-time multipoint conferencing among a plurality of conferencing terminal units wherein the conferencing is performed utilizing digital audio signals that are mixed a predetermined number of times in accordance with a predetermined mixing algorithm, said system comprising:

a first multipoint control unit for transceiving digital audio signals using predetermined protocols for full-duplex communication to/from at least a first conferencing terminal and at least a second multipoint control unit, wherein said full-duplex communication comprises at least an exchange of digital audio signals; and at least the second multipoint control unit, operably coupled to at least a second conferencing terminal unit, for full-duplex communication with at least the first multipoint control unit, wherein the full-duplex communication further includes an exchange of control information, wherein the control information indicates whether an accompanying signal may be mixed;

wherein each multipoint control unit comprises a processor that comprises:

an audio signal selector for receiving a set of all digital audio signals from the multipoint control units and selecting digital audio signals to be transmitted to other multipoint control units, wherein said selecting is made in accordance with a predetermined selection algorithm using the control information received from other conferencing terminal units; and an audio mixer, operably coupled to the audio signal selector, for utilizing a predetermined mixing algorithm for mixing the selected digital audio signals when more than one digital audio signal is selected and for generating control information to indicate whether a resultant digital audio signal may be mixed again.

15. The multipoint control system of claim 14, wherein said audio signal selector receives digital audio signals from only two other multipoint control units.

16. The multipoint control system of claim 14, wherein the audio signal selector of the first multipoint control unit receives digital audio signals from at least the second multipoint control unit and the first conferencing terminal, and selects a digital audio signal from all received digital audio signals wherein said selecting is made in accordance with a predetermined selection algorithm using control information received from at least the second multipoint control unit, to ensure that no more than N digital audio signals are mixed, where N is a positive integer.

17. The multipoint control system of claim 16 wherein N=2.

18. The multipoint control system of claim 14, wherein, in addition, said multipoint conferencing terminals are videoconferencing terminals.

19. The multipoint control system of claim 14, wherein said processor further includes a video switching unit for providing multipoint videoconferencing among the plurality of operably coupled conferencing terminal units.

20. The multipoint control system of claim 14 wherein the digital audio signals are transmitted in frames.

21. The multipoint control system of claim 6 wherein the frames are frames in accordance with an International Telecommunications Union-Telecommunications Sector, i.e., ITU-T, H.221 frame structure.

22. The multipoint control system of claim 21 wherein the conferencing terminal units further operate in compliance with an ITU-T H.320 standard.

23. The multipoint control system of claim 22 wherein framing for communication between multipoint control units includes overhead bits comprising:
A) for inbound frames, 4 bits for audio level and 2 bits for speaker status, and
B) for outbound frames, 1 bit for indicating allow/disallow mixing, 1 bit for assigning a new speaker, 1 bit for freezing video, and 2 bits for indicating speaker status.

24. The multipoint control system of claim 20 wherein processing delay incurred upon audio signal selection and audio mixing is minimized by processing frames of incoming digital audio signals upon arrival, i.e., without storing an entire frame.

25. The multipoint control system of claim 24 wherein a predetermined number of frames of filler bits are inserted at a beginning of mixing for digital audio signals and a same number of frames are eliminated at an end of mixing to ensure non-accumulation of delays.

26. The multipoint control system of claim 14 wherein the predetermined mixing algorithm provides that, upon determining that a digital audio signal to be transmitted has already been mixed N−1 times, mixing control information is set to disallow mixing at other multipoint control units.

27. The multipoint control system of claim 14 wherein the predetermined selection algorithm, when the multipoint control unit is operating as a token holder, provides that a mixed audio of a loudest, i.e., highest power, digital audio signal and a second loudest digital audio signal is selected for transmission towards all multipoint control units, except the multipoint control units that originate the loudest and the second loudest digital audio signals.

28. A multipoint conferencing control system for providing real-time multipoint conferencing from frames of audio input among a plurality of conferencing terminal units using predetermined protocols for full-duplex communication wherein the conferencing is performed utilizing digital audio signals that are mixed a predetermined number of times in accordance with a predetermined mixing algorithm and transmitted as frames, said system comprising:
the plurality of operably coupled multipoint control units to which at least a first local terminal is operably coupled, wherein:
for inbound direction audio processing:
each conferencing terminal unit is utilized for determining a speech level for each frame of audio input from coupled local terminals,
each conferencing terminal unit, excluding a conferencing terminal unit of a present speaker, is utilized for comparing a speech level of each frame of an inbound audio input received from neighboring conferencing terminal unit(s) with a speech level of a frame of audio input of coupled local terminals and transmitting frames from at least a first terminal with a highest speech level of audio input toward/to the conferencing terminal unit of a present speaker; and
the conferencing terminal unit of the present speaker is utilized for transmiting the frames of audio input from at least the first terminal with a highest speech level of audio input to the local terminal of the present speaker, and
for outbound direction audio processing:
the conferencing terminal unit of the present speaker is utilized for transmitting, in accordance with a predetermined scheme, the frames of audio input comprising one of A-B:
A) frames of audio input from the conferencing terminal unit of the present speaker, and
B) frames of audio input from the conferencing terminal unit of the present speaker and at least the first terminal with a highest speech level of audio input, and
for setting an outbound allow/disallow status bit to disallow where mixing has occurred and to allow where only audio input from the conferencing terminal unit of the present speaker is being transmitted,
each conferencing terminal unit, excluding a conferencing terminal unit of a present speaker, is utilized for:
where the outbound allow/disallow status bit is set to allow and inbound audio is louder than audio input from a local terminal, mixing the inbound audio with outbound audio and transmitting the mixed audio to the local terminal and where an inbound audio is weaker than audio input from a local terminal, mixing the local audio with outbound audio and transmitting the mixed audio to the link where the inbound audio is received and changing the outbound allow/disallow status bit to disallow, and
where the outbound allow/disallow status bit is set to disallow, transmitting the outbound audio to the local terminal.

29. The multipoint conferencing control system of claim 28 further including means for providing real-time multipoint video conferencing using packets of video input among a plurality of conferencing terminal units wherein:
the multipoint conferencing unit of the present speaker is utilized for transmitting speaker video packets to the other multipoint conferencing units and for setting outbound video speaker status bits in accordance therewith,
the multipoint conferencing unit of an immediately previous speaker is utilized for replacing inbound video packets with previous speaker video packets and setting inbound video speaker status bits in accordance therewith,
the multipoint conferencing unit of the present speaker is utilized for transmitting a command for assigning speaker video packet designation to a conferencing terminal unit of a new loudest speaker and for transmitting a freeze video command to the other conferencing terminal units, the multipoint conferencing unit of the new loudest speaker, upon receiving the command assigning speaker designation, is utilized for terminating transmission of the command to further multipoint conferencing unit beyond the conferencing terminal unit of the new loudest speaker, for signalling the conferencing terminal unit of the present speaker that the command has been received, for transitioning to a present speaker state and setting speaker status bits in accordance therewith, and after a predetermined timeout, the multipoint conferencing unit of the new loudest speaker, now the present speaker, transmitting a fast video update request to a local terminal of the present speaker, wherein the local terminal is utilized for transmitting a video frame in a fast update mode and a picture release command to unfreeze video displays of the other terminals.

30. The system of claim 28, wherein the predetermined protocols provide that video signals from a present speaker are sent to each of the other conferencing terminal units.

31. The system of claim 28, wherein the predetermined protocols provide that video signals from an immediately previous speaker are sent to the conferencing terminal unit of the present speaker.

* * * * *